United States Patent
Beskrovny et al.

(10) Patent No.: US 9,135,153 B2
(45) Date of Patent: *Sep. 15, 2015

(54) OPTIMIZING TEST DATA PAYLOAD SELECTION FOR TESTING COMPUTER SOFTWARE APPLICATIONS VIA COMPUTER NETWORKS

(71) Applicant: International Business Machines Corporation, Armonk, NY (US)

(72) Inventors: Evgeny Beskrovny, Ramat Gan (IL); Alexander Landa, Haifa (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/217,961

(22) Filed: Mar. 18, 2014

(65) Prior Publication Data
US 2014/0359779 A1    Dec. 4, 2014

Related U.S. Application Data

(63) Continuation of application No. 13/904,523, filed on May 29, 2013.

(51) Int. Cl.
*G06F 11/00* (2006.01)
*G06F 11/36* (2006.01)
(Continued)

(52) U.S. Cl.
CPC .......... *G06F 11/3696* (2013.01); *G06F 21/577* (2013.01); *G06F 21/128* (2013.01); *G06F 21/54* (2013.01)

(58) Field of Classification Search
CPC ..... G06F 21/12; G06F 21/125; G06F 21/128; G06F 21/50; G06F 21/54; G06F 21/57; G06F 21/577; G06F 11/302; G06F 11/3644; G06F 11/3668; G06F 11/3696
See application file for complete search history.

(56) References Cited

U.S. PATENT DOCUMENTS 7,849,448 B2    12/2010 Yunus et al.
7,975,296 B2 *   7/2011 Apfelbaum et al. ............ 726/22
(Continued)

FOREIGN PATENT DOCUMENTS

JP    2006227958 A    8/2006
JP    2008112300 A    5/2008
(Continued)

OTHER PUBLICATIONS

Anonymous, "System, Method and Apparatus for On-The-Fly Redundancy Detection and Elimination During Dynamic Testing Using a glass-Box Methodology," The IP.com Prior Art Database, Jul. 4, 2011, pp. 1-4.
(Continued)

*Primary Examiner* — Joseph Kudirka
(74) *Attorney, Agent, or Firm* — Holland & Knight LLP; Brian J. Colandreo, Esq.; Jeffrey T. Placker, Esq.

(57) ABSTRACT

Testing a computer software application by configuring a first computer to execute a copy of data-checking software used by a computer software application at a second computer, processing a first copy of a test data payload using the data-checking software at the first computer, where the test data payload is configured to test for an associated security vulnerability, determining that the first copy of the test data payload is endorsed by the data-checking software at the first computer for further processing, and sending a second copy of the test data payload via a computer network to the computer software application at the second computer for processing threat.

8 Claims, 3 Drawing Sheets

(51) Int. Cl.
*G06F 21/57* (2013.01)
*G06F 21/12* (2013.01)
*G06F 21/54* (2013.01)

(56) References Cited

U.S. PATENT DOCUMENTS

| | | | |
|---|---|---|---|
| 8,789,187 B1* | 7/2014 | Pennington et al. | 726/25 |
| 2009/0119777 A1 | 5/2009 | Jeon | |
| 2009/0205047 A1 | 8/2009 | Podjarny | |
| 2010/0050263 A1 | 2/2010 | Weisman | |
| 2010/0293616 A1 | 11/2010 | Young | |
| 2011/0231936 A1* | 9/2011 | Williams et al. | 726/25 |
| 2012/0096536 A1* | 4/2012 | Dewey et al. | 726/11 |
| 2012/0254839 A1 | 10/2012 | Fink et al. | |
| 2012/0260344 A1 | 10/2012 | Maor et al. | |
| 2013/0086686 A1 | 4/2013 | Pistoia et al. | |

FOREIGN PATENT DOCUMENTS

| | | |
|---|---|---|
| JP | 2008262311 A | 10/2008 |
| WO | WO 2011073982 A1 * | 6/2011 |

OTHER PUBLICATIONS

Antunes et al., "Effective Detection of SQL/XPath Injection Vulnerabilities in Web Services," 2009 IEEE International Conference on Services Computing, pp. 260-267.

International Search Report and Written Opinion received in International Application No. PCT/IB2014/060098, Dated Jun. 24, 2014, pp. 1-8.

* cited by examiner

OPTIMIZING TEST DATA PAYLOAD SELECTION FOR TESTING COMPUTER SOFTWARE APPLICATIONS VIA COMPUTER NETWORKS

RELATED APPLICATIONS

The subject application is a continuation application of U.S. patent application with Ser. No. 13/904,523, filed on May 29, 2013, the entire content of which is herein incorporated by reference.

TECHNICAL FIELD

The invention relates to computer software testing in general.

BACKGROUND

Dynamic analysis tools are often used by computer software developers to test computer software applications, typically by first exploring a computer software application to discover its interfaces, including those by which data may be provided to the application, and then by interacting with the application's interfaces and monitoring the application's responses to such interactions. In one type of dynamic analysis a computer software application is tested for security vulnerabilities by providing test data with known malicious properties to the application, and then observing the behavior of the application. For example, dynamic analysis may be used to test a web application that is accessed over a computer network, such as the Internet, by employing a "black-box tester" running on one computer that sends HTTP requests via a computer network to the web application that is hosted by another computer. The HTTP requests are configured with malicious test data payloads drawn from a library of test data payloads designed to test for security vulnerabilities such as SQL injection, cross-site scripting, and command injection.

A black-box tester could send all possible test data payloads to a computer software application to test for all possible security vulnerabilities. However, as the cost of sending many HTTP requests via a computer network is high in terms of time and bandwidth, commercial black-box testers that test web applications via computer networks typically send only a few dozen test payloads per HTTP parameter being tested in order to keep such costs down. Unfortunately, this often means that some security vulnerabilities go undetected.

SUMMARY

In one aspect of the invention a method is provided for testing a computer software application, the method including configuring a first computer to execute a copy of data-checking software used by a computer software application at a second computer, processing a first copy of a test data payload using the data-checking software at the first computer, where the test data payload is configured to test for an associated security vulnerability, determining that the first copy of the test data payload is endorsed by the data-checking software at the first computer for further processing, and sending a second copy of the test data payload via a computer network to the computer software application at the second computer for processing threat.

In other aspects of the invention systems and computer program products embodying the invention are provided.

BRIEF DESCRIPTION OF THE DRAWINGS

The invention will be understood and appreciated more fully from the following detailed description taken in conjunction with the appended drawings in which.

DETAILED DESCRIPTION

Figure 1:
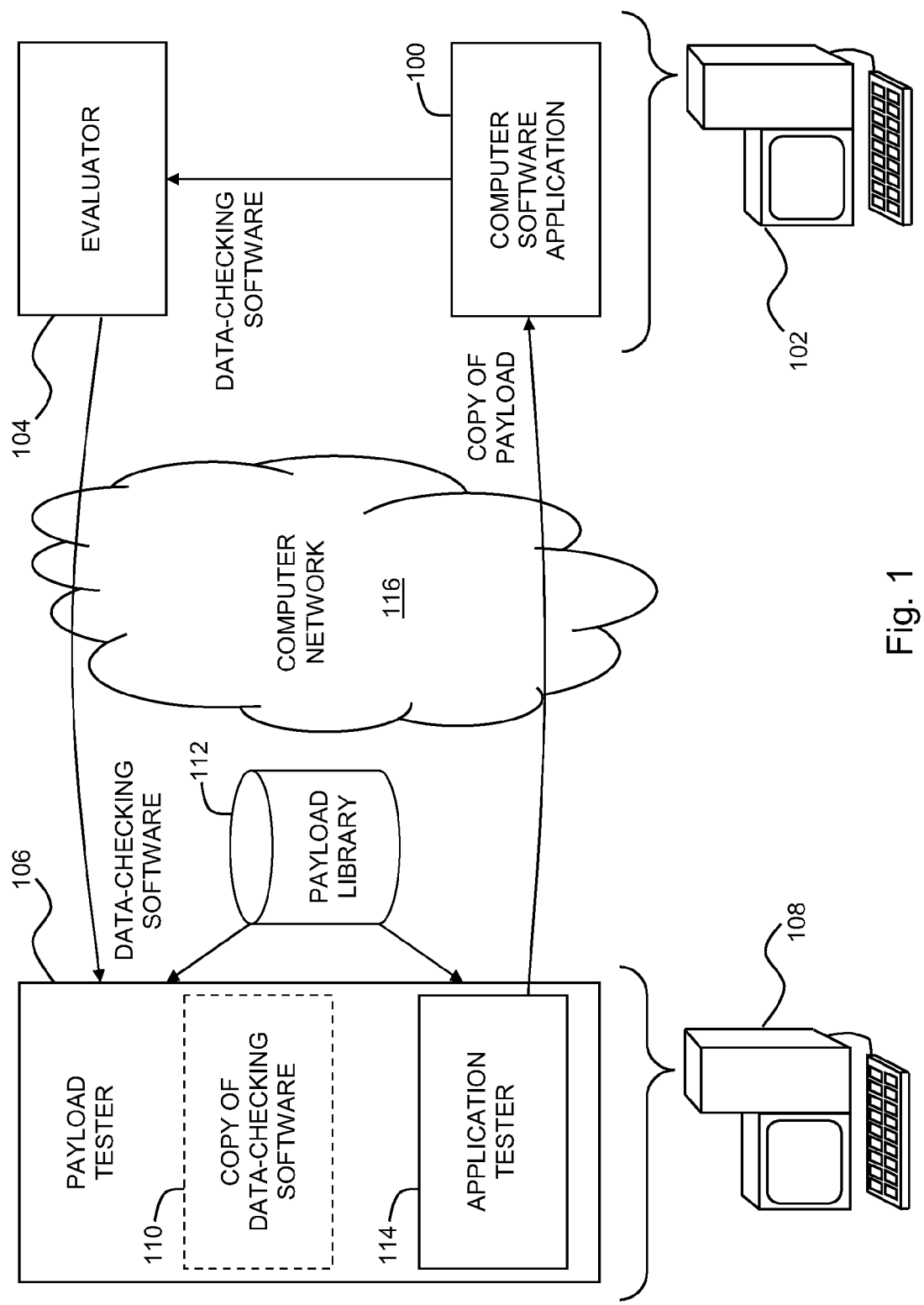
FIG. 1 is a simplified conceptual illustration of a system for testing a computer software application, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for testing a computer software application, constructed and operative in accordance with an embodiment of the invention. In the system of FIG. 1 a computer software application 100 is shown that is hosted by a computer 102, where computer software application 100 may be designed to be accessed via a computer network. Computer software application 100 may, for example, be a "web" application including Hypertext Markup Language (HTML)-encoded web pages, with computer 102 acting as a web application server. Computer software application 100 may be evaluated by an evaluator 104 to identify data-checking software used by computer software application 100, such as by employing conventional "glass box" testing techniques where computer software application 100 is instrumented with software instructions that identify such data-checking software. The data-checking software may, for example, be a "sanitizer" that endorses user-provided input for further processing by computer software application 100 by subjecting the input to mutation criteria, typically where an input string is mapped to an output string for further processing by computer software application 100. Alternatively, the data-checking software may be a "validator" that endorses user-provided input for further processing by computer software application 100 by subjecting the input to validation criteria, typically where an input string is mapped to a Boolean value indicating whether the input may be further processed by computer software application 100. Some examples of such data-checking software include:

Framework configuration files in which custom validators for input parameters are declaratively defined. For example, in Apache Struts 2™, commercially available from The Apache Software Foundation, Los Angeles, Calif., a user may specify within a configuration file a regular expression that is to be matched against the user-provided input for a given parameter;

Commercially-available security libraries that are known to contain sanitizers and/or validators;

Methods having characteristics of a sanitizer or a validator, such as a static method that accepts a string as input and returns a string as output, or that accepts a string as input and returns a Boolean value, or that is a data-flow bottleneck that receives requests from multiple sources;

Regular-expression libraries, such as the java.util.regex package in Java™.

Evaluator 104 may provide a payload tester 106 at a computer 108 with a description of the data-checking software used by computer software application 100, optionally providing a copy of the data-checking software itself to payload tester 106. Payload tester 106 may be configured to configure computer 108 to execute a copy 110 of the data-checking software used by computer software application 100. Payload tester 106 may process copies of one or more test data payloads by providing the copies of the test data payloads to copy 110 of the data-checking software for processing. The test data payloads may be stored at computer 108 in a library 112 of predefined test data payloads that may be configured to test for one or more known security vulnerabilities, such as SQL injection, cross-site scripting, and command injection, such as where each test data payload includes a malicious payload designed to exploit the security vulnerability. Payload tester 106 may be configured to determine whether each test data payload copy that is processed by copy 110 of the data-checking software is endorsed by the copy 110 of the data-checking software for further processing. Since a test data payload copy may undergo mutation during processing by the data-checking software, payload tester 106 may also be configured to endorse any test data payload copy where payload tester 106 determines that the test data payload copy remains configured to test for its associated security vulnerability after processing by the copy 110 of the data-checking software, such as by determining that the processed test data payload copy sufficiently retains its malicious characteristics. Thus, for example, if the data-checking software is a validator, then payload tester 106 determines whether a test data payload copy that is processed by copy 110 of the data-checking software may be determined by the data-checking software to be acceptable for further processing. Likewise, if the data-checking software is a sanitizer, then payload tester 106 may determine whether the mutated version of a test data payload copy that is processed by copy 110 of the data-checking software is able to test for the security vulnerability associated with the test data payload.

For any test data payload copy that, after processing by copy 110 of the data-checking software, is endorsed for further processing as described above, an application tester 114 at computer 108 may be configured to send a copy of the test data payload via a computer network 116 to computer software application 100 at computer 102 for processing. Conversely, any test data payload copy that, after processing by copy 110 of the data-checking software, is not endorsed for further processing as described above, application tester 114 may not send a copy of the test data payload via computer network 116 to computer software application 100 at computer 102 for processing. In this manner, rather than application tester 114 simply sending all possible test data payloads in library 112 via computer network 116 to computer software application 110 to test for all possible security vulnerabilities, and rather than application tester 114 sending an arbitrarily reduced set of test data payloads via computer network 116 to computer software application 110, application tester 114 may only send those test data payloads that will have the greatest chance of exposing security vulnerabilities at computer software application 110.

Any of the elements shown in FIG. 1 may be implemented in computer hardware and/or in computer software embodied in a non-transitory, computer-readable medium in accordance with conventional techniques.

Figure 2:
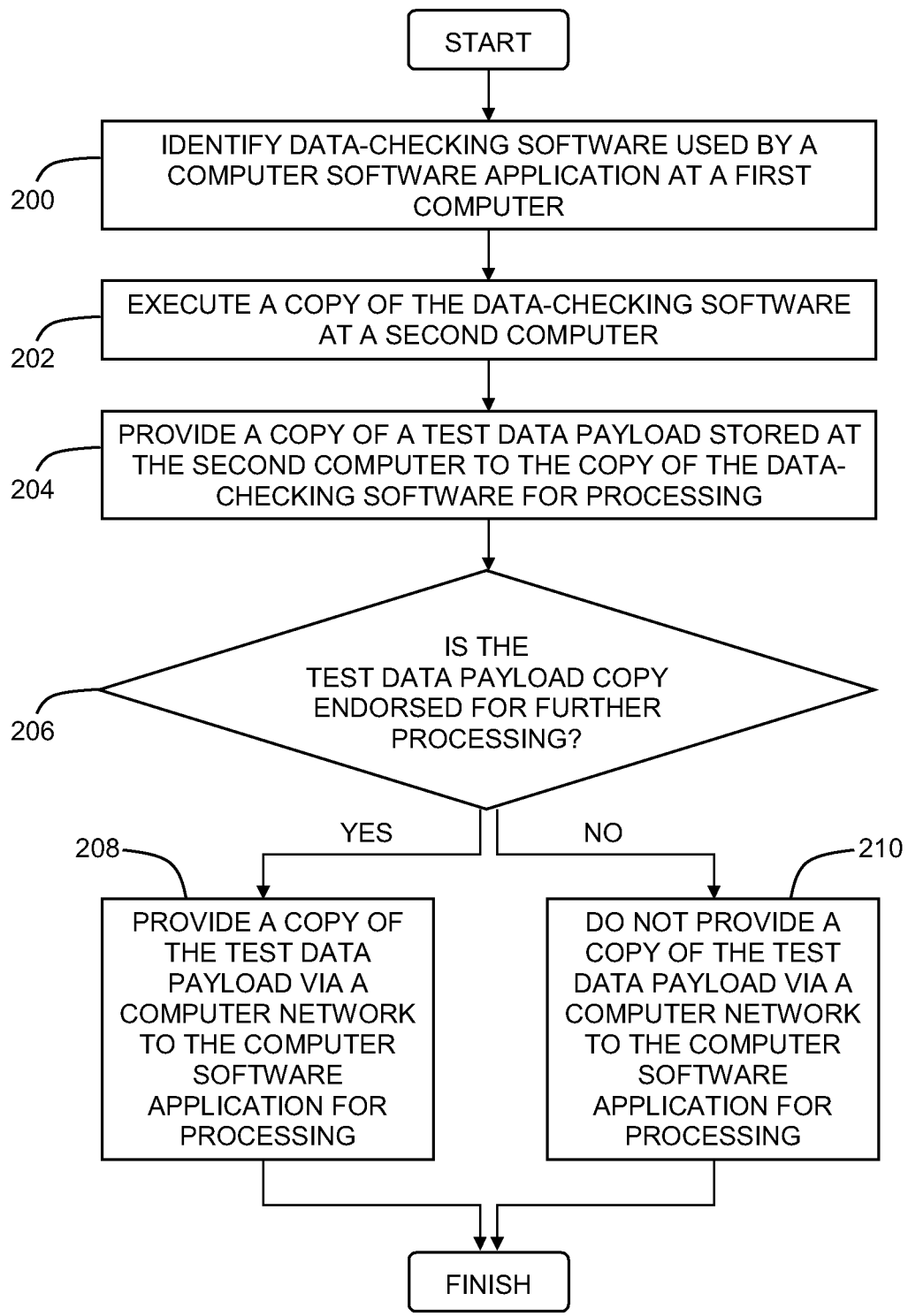
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 data-checking software used by a computer software application at a first computer may be identified (step 200). A second computer may be configured to execute a copy of the identified data-checking software (step 202). Copies of one or more test data payloads stored at the second computer may be provided to the copy of the identified data-checking software at the second computer for processing (step 204), where the test data payloads may be configured to test for one or more known security vulnerabilities. If a processed test data payload copy is endorsed for further processing (step 206), then a copy of the test data payload may be sent via a computer network to the computer software application at the first computer for processing (step 208), otherwise copies of test data payloads may not be sent via a computer network to the computer software application at the first computer for processing (step 208).

The system of FIG. 1 and method of FIG. 2 may be illustrated in the context of the following example, where evaluator 104 is implemented using IBM AppScan™ Standard Edition, commercially available from IBM Corporation, Armonk, N.Y. Computer software application 100 that is hosted by computer 102 may be instrumented, such as at computer 102, to identify sanitizers and validators for detection as such by evaluator 104. Evaluator 104 reports the identified sanitizers and validators to payload tester 106, which may be implemented using IBM AppScan™ Enterprise Edition, commercially available from IBM Corporation, Armonk, N.Y. Payload tester 106 may configure computer 108 to execute copies of the identified sanitizers and validators. Payload tester 106 provides a copy of the following test data payload <SCscriptRIPT>alert('XSS4')</SCscriptRIPT> to a copy of an identified sanitizer executing on computer 108, such as the following sanitizer

```
<?php
    $param = $_REQUEST['param'];
    $param = str_replace('on', '', $param);
    $param = str_replace('script', '', $param);
    $param = str_replace('"', 'n"', $param);
?>
``` which mutates the test data payload copy into

<SCRIPT>alert('XSS4')</SCRIPT>.

The test data payload may be configured to test for a cross-site scripting (XSS) vulnerability. Payload tester 106 determines that the mutation remains configured to test for the security vulnerability after processing by the copy of the sanitizer, whereupon application tester 114 may send a copy of the test data payload via a computer network 116 to computer software application 100 at computer 102 for processing.

Payload tester 106 also provides a copy of the following test data payload

<SCRIPT>alert('XSS4')</SCRIPT> to a copy of an identified validator executing on computer 108. The test data payload may likewise be configured to test for a cross-site scripting (XSS) vulnerability. Payload tester 106 may determine that test data payload copy cannot be used to test for the security vulnerability after processing by the copy of the validator, as the validator maps the test data payload copy to a "false" Boolean value which in the context of the validator indicates that the test data payload is not available for further processing. Application tester 114 therefore may not send a copy of the test data payload via a computer network 116 to computer software application 100 at computer 102 for processing.

Figure 3:
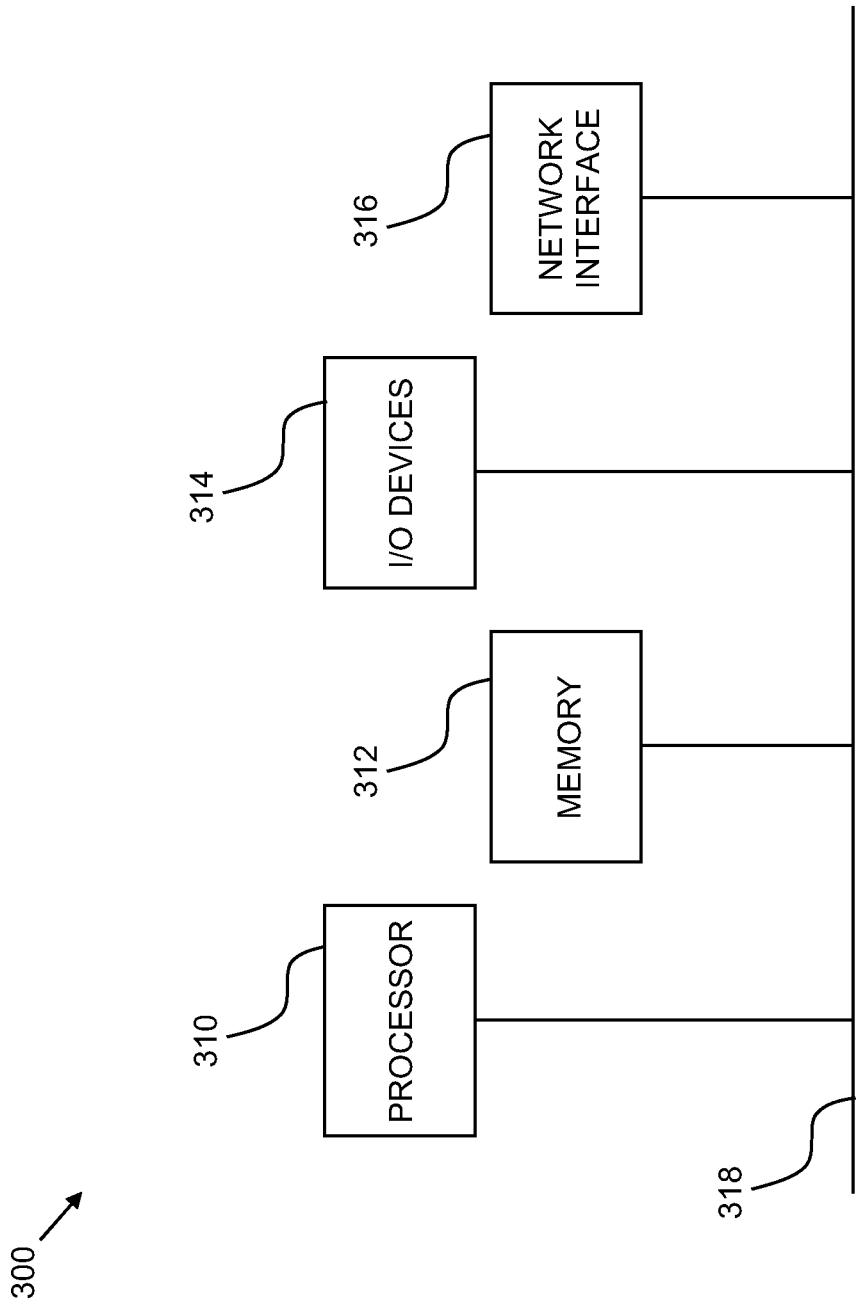
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for testing a computer software application, the method comprising:
   providing, to a first computer, a copy of data-checking software from a second computer, the data-checking software used by a computer application at the second computer;
   configuring the first computer to execute the copy of data-checking software used by the computer software application at the second computer;
   processing a first copy of a test data payload using the data-checking software at the first computer, wherein the test data payload is configured to test for an associated security vulnerability;
   determining that the first copy of the test data payload is endorsed by the data-checking software at the first computer for further processing; and
   sending a second copy of the test data payload via a computer network to the computer software application at the second computer for processing threat.

2. The method according to claim 1 and further comprising identifying the data-checking software used by the computer software application.

3. The method according to claim 2 wherein the identifying comprises determining that the data-checking software is any of a sanitizer and a validator.

4. The method according to claim 2 and further comprising instrumenting the computer software application to perform the identifying.

5. The method according to claim 1 wherein the processing comprises processing wherein the test data payload is stored at the first computer.

6. The method according to claim 1 wherein the processing comprises processing wherein the test data payload includes a malicious payload designed to exploit the security vulnerability.

7. The method according to claim 1 wherein the determining comprises determining that the first copy of the test data payload is configured to test for its associated security vulnerability after being processed by the data-checking software at the first computer.

8. The method according to claim 1 wherein the configuring, processing, determining, and sending are performed wherein the computer software application is a web application.

* * * * *